United States Patent Office 3,408,035
Patented Oct. 29, 1968

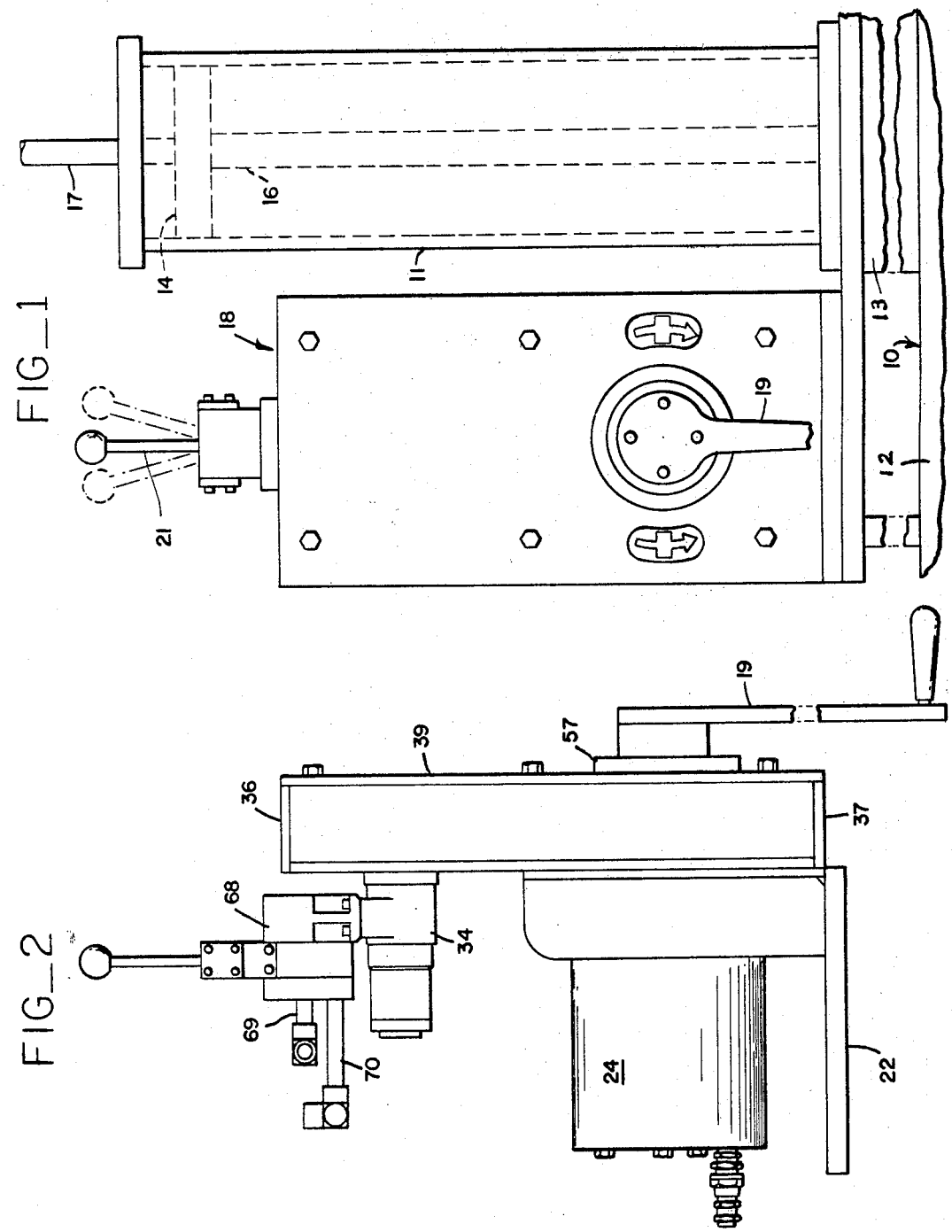
Oct. 29, 1968     F. M. LATHROP II, ET AL     3,408,035
FLOW CONTROL SYSTEMS AND OPERATOR THEREFOR
Filed Nov. 10, 1965     3 Sheets-Sheet 1
INVENTORS
FRANCIS M. LATHROP, II
PAUL M. DECKER
ATTORNEYS

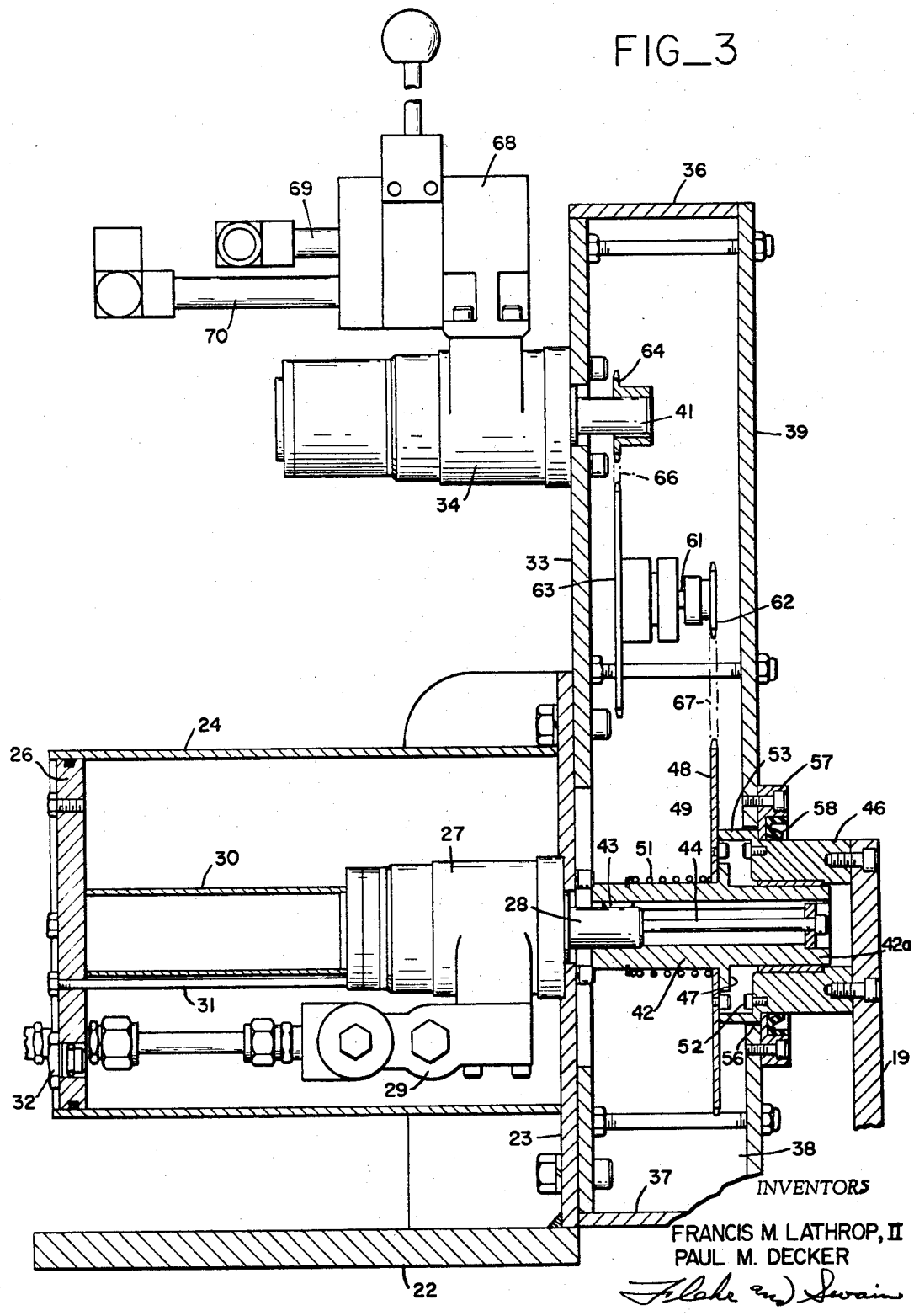

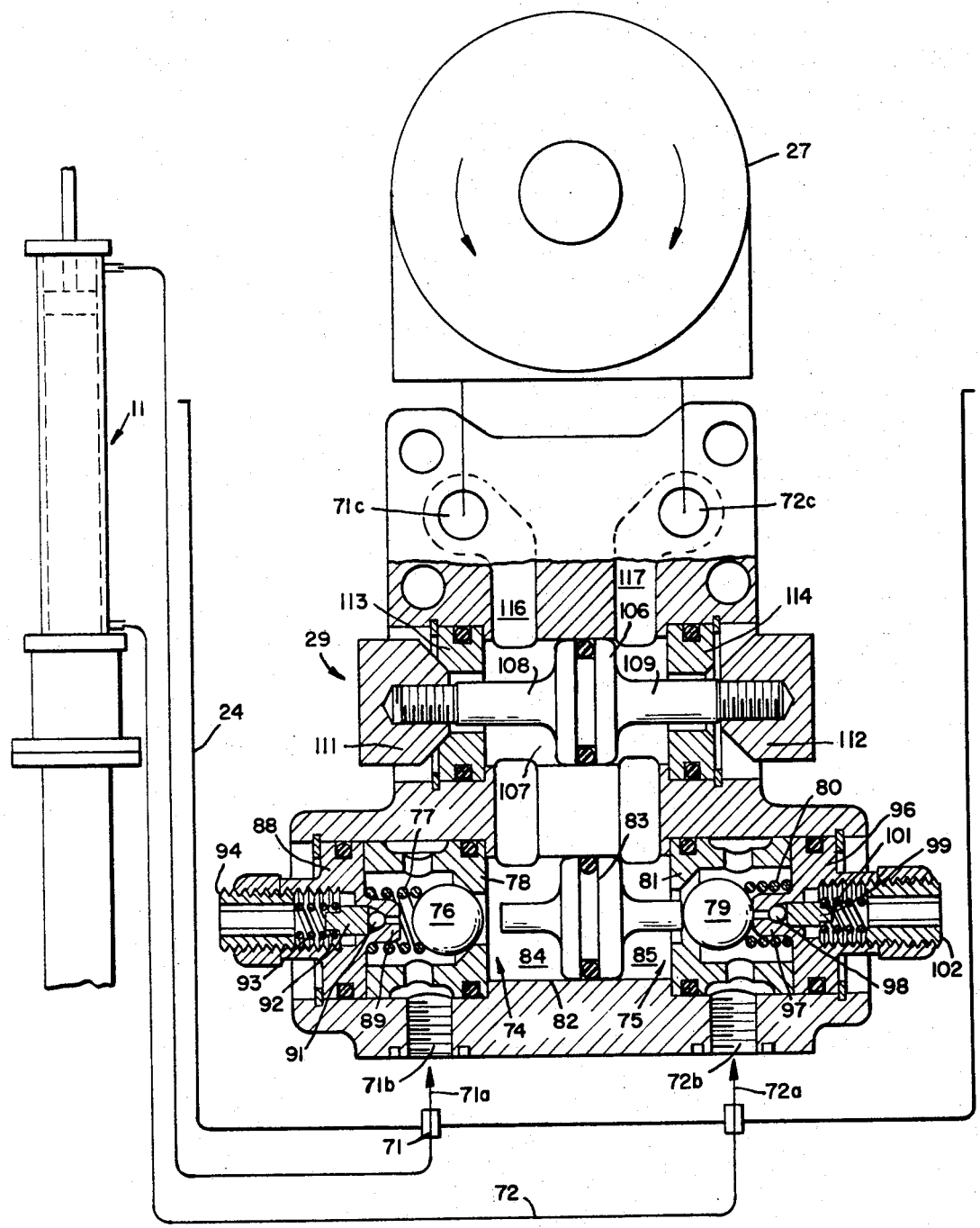
FIG_4

3,408,035
FLOW CONTROL SYSTEMS AND
OPERATOR THEREFOR
Francis M. Lathrop II and Paul M. Decker, Houston, Tex., assignors, by mesne assignments, to M & J Valve Company, Houston, Tex., a corporation of Delaware
Continuation-in-part of application Ser. No. 479,262, Aug. 12, 1965. This application Nov. 10, 1965, Ser. No. 507,161
3 Claims. (Cl. 251—14)

ABSTRACT OF THE DISCLOSURE

A hydraulic system using a reversible hydraulic pump for actuating the hydraulic operator of a valve, whereby the valve is opened or closed by driving the pump in one direction or the other. Selective means is provided for connecting the shaft of the pump to either manual (e.g., a hand crank), or power operating means.

This application is a continuation-in-part of our co-pending application Ser. No. 479,262, filed Aug. 12, 1965, now abandoned, for "Flow Control Apparatus and Ap-erator Therefor."

This invention relates generally to systems of the type including a flow control valve having a valve member movable in opposite directions between open and closed valve operating positions. More particularly it pertains to hydraulic operators for effecting the operation of the valves of such systems.

A variety of operating devices and systems have been developed for the operation of the more conventional fluid control valves. Conventional gate, ball and plug valves are provided with a valve member which is movable in opposite directions between limiting positions to effect full opening or closing. It is recognized that the problem of operating such valves becomes more serious as the valves increase in size. It is common to make valves of the gate, ball and plug types in sizes ranging up to 36 inches or more, and the systems in which such valves may be installed may involve a wide variety of climatic conditions and power availability. The various operators now available for such valves are subject to a number of difficulties. Many of the operators are not readily adaptable for both manual and power operation. It is well known that manual operation is desirable in many instances for emergency operation. Where manual operators have been made for valves of the larger sizes, the amount of manual effort required to effect their operation has been excessive. One type of conventional hydraulic operator employs a pump together with a four-way control valve which is manually set depending upon whether the valve is to be opened or closed. Such an arrangement requires double manipulation, which may be confusing to the operator and which complicates power operation.

In general, it is an object of the present invention to provide novel hydraulic valve operating means which overcomes the difficulties of prior operators.

Another object of the invention is to provide a hydraulic operator that is relatively simple in construction and simple to operate. Particularly, our invention makes possible the opening and closing of a valve by simple direct operation of a pump.

Another object of the invention is to provide hydraulic valve operating means which can be readily operated manually as well as by power means.

Another object of the invention is to provide a hydraulic operator that is characterized by its ability to apply relatively high forces for commencing movement of the valve but without requiring excessive torque to turn the hand wheel or pump shaft.

Another object of the invention is to provide a novel assembly unit that can be readily installed on various conventional valves for their hydraulic operation.

Additional objects and features of the invention will appear from the following description in which the preferred embodiment has been set forth in detail in conjunction with the accompanying drawing.

Referring to the drawing:

FIGURE 1 is a side elevational view showing a portion of a gate valve and operating means therefor in accordance with the present invention;

FIGURE 2 is a side view of the operating unit shown in FIGURE 1;

FIGURE 3 is a cross-sectional view of the operating unit shown in FIGURE 2; and

FIGURE 4 is a schematic view showing the manner in which our operator is connected with a hydraulic device to effect valve operation, and also showing details of the control valve assembly.

Referring to FIGURE 1, the valve 10 is of the gate type and is shown having a hydraulic device 11 mounted upon the same. The particular valve illustrated is of the type disclosed in copending application S.N. 409,710 filed Nov. 9, 1964, now Patent No. 3,260,503, and consists of a body 12 which encloses a flat or slab-like gate (not shown). An operating rod extending through the bonnet assembly 13 makes connection with the gate. The piston 14 connects with the piston rod 16, which may be an extension of the operating rod of the valve, or a separate rod attached to the valve rod. A rod 17 is attached to the piston and extends through a seal at the upper end of the cylinder. It functions as an indicator to visually determine the position of the valve. The rod 17 may be of a diameter smaller than the piston rod 16 whereby the effective cross-sectional area of the cylinder spaces on opposite sides of the piston may vary considerably.

The use of a double acting piston-cylinder type of hydraulic device is generally considered desirable for the operation of gate valves because of its rectilinear reciprocating motion. Where it is desired to operate valves of the ball or plug type, the hydraulic device may be one suitable for providing rotary motion between 90° limits. In any event, the device is double acting and has two hydraulic chambers for receiving hydraulic liquid.

Our operator assembly unit 18 is mounted upon the top of the gate valve, alongside the hydraulic cylinder 11. It has a crank 19 for manual operation, and a control member 21 for power operation.

FIGURES 2 and 3 illustrate a desirable construction for the operator unit 18. It consists of mounting means including the base plate 22 which carries the upright plate 23. One end of a cylindrical shell 24 is attached to plate 23, and its other end is provided with the removable sealed end wall or closure 26. Also mounted upon the plate 23 within the shell 24, there is a reversible hydraulic pump 27 having an operating shaft 28. Below the pump 27 and bolted to the same, there is a valve assembly 29. The closure 26 is shown normally seated upon a strut 30 which extends between the enclosure and one end of the pump 27. Rods 31 are shown for retaining the closure 29 in place. The shell 24 forms a reservoir for the hydraulic liquid, which may be introduced through the normally closed fitting 32.

A second plate 33 is secured to the plate 23 and serves to mount the motor 34. Plate 33 forms the rear wall of a housing comprising top, bottom and side walls 36, 37 and 38, together with the removable front wall 39.

Mechanism is provided for selectively connecting the operating shaft 28 of the pump 27 to either the crank 19 or the shaft 41 of the motor 34. Thus a sleeve 42 is shown fixed to the shaft 28 by the key 43 and the attaching screw 44. Crank 19 is secured to a hub 46 which is journalled upon the outer end portion 42a of the sleeve 42. A first clutch part 47 is formed on the sleeve 42 and may be square in configuration. A second clutch part 48 is in the form of a sprocket and is provided with lugs 49 that may operatively engage with the clutch part 47. The sprocket 48 is loosely carried by the sleeve 42, and is urged toward the clutch part 47 by the compression spring 51. The inner end of the hub 46 is provided with lugs 52 forming a third clutch part, the lugs being located whereby they can establish driving engagement with the first clutch part 47. Also the inner end of the hub 46 is provided with the rim 53 whereby the hub is shifted axially of the sleeve 42 to bring the lugs 52 into operating engagement with the clutch part 47, the sprocket 48 is moved to the left whereby its lugs 49 are disengaged with respect to clutch part 47. Removal of the hub 46 is prevented by an annular shoulder 56 which engages the retention ring 57. The ring 57 can also serve to carry the dust seal 58.

The sprocket 48 is operatively connected with the shaft 41 of the motor 34 by suitable chain and sprocket drive means. Thus a countershaft 61 is shown with sprockets 62 and 63. The sprocket 64 mounted upon motor shaft 41 is connected by chain 66 with the sprocket 63, and sprocket 62 is connected by chain 67 with the sprocket 48.

The motor 34 may be electric, pneumatic or hydraulic. If electric, the control device 68 is a suitable reversing switch. If pneumatic or hydraulic, control device 68 can be a suitable control valve connected to the supply and waste pipes 69 and 70 and with the porting of the motor to effect the desired reversible operation. Gas supplied to the motor may be from a storage reservoir, or from the upstream or high pressure side of the valve being operated.

FIGURE 4 illustrates a suitable construction for the valve assembly 29. Likewise, in this schematic view the ends of the piston-cylinder device 11 are connected by lines 71 and 72 to the pipes lines 71a and 72a within the shell 24 and to the assembly 29. The valve assembly consists of a body 73 which can be in the form of a casting, and which is adapted to be bolted directly to the underside of the pump 27. Its ports 71c and 72c make direct connection with corresponding ports of the pump as schematically illustrated. The openings 71b and 72b are directly connected with the pipes lines 71a and 72a. Locking valves incorporated in this assembly are generally indicated at 74 and 75. The valve 74 consists of valve ball 76 urged by spring 77 against its seat 78. Valve 75 similarly consists of the ball 79 urged by spring 80 against seat 81. Between the two seats 74 and 75 there is a cylindrical bore 82 which accommodates a piston-like shuttle device 83. When fluid pressure is applied to the space 84 at one side of the shuttle, it is moved to the right to unseat the ball 79. Conversely, when liquid under pressure is applied to space 85, the shuttle is moved to the left to unseat the ball 76. In its intermediate position it permits both balls 76 and 78 to be in their closed positions.

The locking valves 74 and 75 also incorporate pressure relief valves. Thus the member 88, which holds the cage of the lock valve 74 in place, forms a seat 89 for the small valve ball 91. This ball is urged by plunger 92 and compression spring 93 against its seat. The loading of the spring can be adjusted by adjusting the setting of the threaded fitting 94 which contains the spring. The control valve 75 is similarly constructed and includes the mounting member 96 together with valve seat 97, valve ball 98, plunger 99 and compression spring 101. Here again adjustment of the threaded member 102 regulates the loading.

The valve assembly also includes supplemental valve means which serves to vent one side or the other of the pump to the reservoir when that line is conducting liquid from the hydraulic cylinder. The supplemental valve means can consist of the piston-like shuttle device 106 which is fitted within the cylindrical bore 107. The stems 108 and 109, extending from opposite sides of the shuttle device, 106 carry valve members 111 and 112 that cooperate with the stationary seats 113 and 114.

The ducts 116–117 in the body 73 are in direct communication between the ports 71c and 72c and the spaces 84 and 85. Therefore, when the pump 27 is operated in a direction to apply liquid under pressure to the port 71c, such pressure is applied to the shuttle device 106 whereby it moves to the right to close valve member 111 and open vavlve member 112. Therefore, under such conditions the port 72c is vented to the lower part of the shell 24. Likewise when the pump is operated in the reverse direction, fluid pressure is applied to the port 72c with the result that the shuttle device 106 is moved toward the left to open the valve member 111 and close valve member 112.

Operation of the entire valve assembly is as follows: It is assumed that all of the hydraulic lines are fitted with liquid and that a quantity of liquid is in the shell 24 to a line well above the valve assembly 29. When the pump is operated to apply liquid pressure to the port 71c, such pressure is applied through the ducts 116 to the space 84, because valve 111 is closed. The pressure overcomes the thrust of spring 77 whereby ball 76 moves to open position to permit the liquid to flow through the opening 71b and pipe 71a to the line 71. The liquid thereby discharged from the other end of the cylinder flows through the line 72, pipe 72a, past the open ball 79 and through duct 117 to the pump. If, because of the difference between the effective cross-sectional areas of the two sides of the piston, the amount of liquid being returned is greater than that being supplied to the cylinder, then some of such liquid may vent into the reservoir past the valve 112. Similarly if the amount of liquid being returned is not as great as that being supplied to the cylinder, then some liquid from the reservoir flows past the valve 112 to merge with the liquid being returned to the pump.

When roation of the pump is interrupted, the shuttle device 83 moves to its intermediate position, whereby both balls 76 and 79 are closed. The piston is now locked against moving downwardly by gravity, because discharge of liquid from the cylinder back to the pump is prevented under such conditions by one or the other of the valves 76 or 79 functioning as a check.

In the event the gate valve meets an obstruction while it is being operated, or in the event the operator attempts to continue operation of the pump after the gate has been moved to one of its limiting positions, the liquid pressure may build up to a maximum value sufficient to open one or the other of the two relief valves. Liquid thus permitted to escape is discharged directly into the reservoir. This serves as a safety against application of operating forces which otherwise might be sufficient to cause injury or breakage.

The particular pump selected should be one capable of supplying fluid pressures of the order required for proper operation under various conditions, while at the same time supplying an adequate volume of liquid to provide a cycle of operation within reasonable time limits. We have had good success utilizing pumps of the type employing the so-called gerotor star (see Reissue 25,291). Such a pump is capable of developing pressures of the order of 3500 p.s.i. or higher with a minimum amount of slippage. Pumps of this type are manufactured by Char-Lynn Company, Minneapolis, Minn. We have found that the same device can be used as a reversible driving motor when supplied with compressed air or other gas.

Aside from pumps of the type described above, it is possible to use other types of positive displacement pumps, such as for example, variable displacement pumps of the type manufactured by Delavan Manufacturing Co., West Des Moines, Iowa. The Delavan type pump is of the axial piston type utilizing a tilted cam plate to operate the pistons.

It is also desirable that the pump employed be one which will provide pressure pulses when torque is applied to develop maximum pressure. With the type of pumps referred to above, such pressure pulses are obtained, which is attributed to the fact that their valving is of the slide port type, as distinguished from poppet or like valves.

Operation of our complete system can be summarized as follows: It is assumed that the system includes a gate valve and a cylinder having its piston directly attached to the gate. Also it is assumed that the gate normally remains in its upper full open position, with the piston in its uppermost position. Under such conditions the weight of the gate is largely carried by the pipston, but the piston remains in a fixed position because the hydraulic liquid below the piston is locked against flow back through the line 72 by the lock valve 75. If one desires to close the valve by power operation, the operating lever 21 is moved to close position from its neutral position, with the result that motor 34 is energized to drive the shaft 28 of the pump 27 in the proper direction. The proper direction in this instance will be such as to supply liquid under pressure through the line 71, and effectively to connect line 72 with the other side of the pump. Immediately upon application of liquid pressure to the line 71, valve member 111 is closed by operation of the shuttle device 106, and the ball 79 is opened by the shuttle device 83.

If the valve gate should meet an obstruction in its movement, the pressure builds up, and when it reaches a maximum value liquid is vented through the ball check 91 to relieve the applied pressure. When the valve gate is fully closed, it likewise engages limiting stops whereby again the pressure may build up to a maximum value which may again effect opening of the relief ball 91. Assuming however that the equipment is being manually operated, operator is apprised of full closed position of the gate and will immediately move the control lever 21 back to its neutral position.

In some instances it may be desirable to initiate operation from a remote point. For example, for remote operation the motor 34 may be electrical, and a remote switch may be employed for effecting energization of the motor. Limiting switches can then be installed in conjunction with the rod 17 to deenergize the motor immediately when then gate has reached a limiting position.

Assuming that there is a power failure, due, for example, to a failure in the gas pressure supply for the motor 34, hand operation can be resorted to by moving the crank 19 to the left as viewed in FIGURE 3 whereby the sprocket and lugs 49 are disengaged from the clutch part 47, and clutching engagement made with the lugs 54. The crank is turned in either direction as indicated in FIGURE 3, depending upon whether the valve is to be opened or closed. It may happen that the valve requires some extra force to break it loose from a limiting position, particularly if it has been standing for some time without operation. It has been found that by the use of either crank or power means, relatively heavy torque can be applied to initiate operation of the pump, having reference to torques which will develop pump pressures adequate to start the valve gate in motion. After the valve gate has been started from a limiting position, the crank can be rotated at a relatively good speed, because the hydraulic pressure required and the corresponding torque are relatively low.

We claim:
1. In systems of the type including a flow control valve having a valve member adapted to be moved in opposite directions between limiting positions for positioning the valve in either full open or closed positions, hydraulic means for moving the valve between said limiting positions comprising a double acting hydraulic device having a pair of hydraulic chambers adapted to receive hydraulic liquid, said device being connected to said valve member, a reversible hydraulic pump having an operating shaft rotatable in either direction, the pump having a pair of fluid flow passages each functioning as an inlet and a discharge passage depending upon the direction of rotation of the operating shaft, means forming fluid connections between said passages and the chambers of said hydraulic device, and selective means for operatively connecting the shaft of the pump to either manual or power operating means.

2. In a valve operator, mounting means, a shell forming a liquid reservoir secured to the mounting means, a reversible hydraulic pump positioned within the shell and secured to the mounting, the operating shaft of said pump extending exterior of the shell, a valve assembly attached to the underside of the pump and in communication with the same, a pair of pipes connecting the valve assembly to the exterior of the shell and adapted to be connected to a double acting device to be operated by hydraulic liquid pressure, the valve assembly including locking valves associated with the pipes whereby when hydraulic liquid is being supplied by the pump to one pipe back flow of liquid through such pipe is prevented and the other pipe is in communication with the pump for returning liquid to the same, and mechanical means carried by the mounting and coupled to the shaft of the pump to rotate the same in either direction.

3. Apparatus as in claim 1 in which the manual means consists of a rotatable hand crank, the crank being axially shiftable between manual and power operating positions, the selective means serving to operatively connect the hand crank to the pump and to simultaneously disconnect the power operating means from the pump when the crank is in hand operating position and also serving to disconnect the hand crank from the pump and to operatively connect the power means to the pump for the power operating position of the handle.

References Cited
UNITED STATES PATENTS

| 1,616,841 | 2/1927 | Beebe | 60—52 X |
| 2,467,508 | 4/1949 | Trautman | 91—420 X |
| 2,483,312 | 9/1949 | Clay | 91—420 X |
| 2,496,740 | 2/1950 | Morey | 251—14 X |

ARNOLD ROSENTHAL, *Primary Examiner.*